Oct. 10, 1967   W. S. THOMPSON, JR., ET AL   3,346,002
ROTARY VALVE WITH EXPANDABLE LINER
Filed Feb. 12, 1965
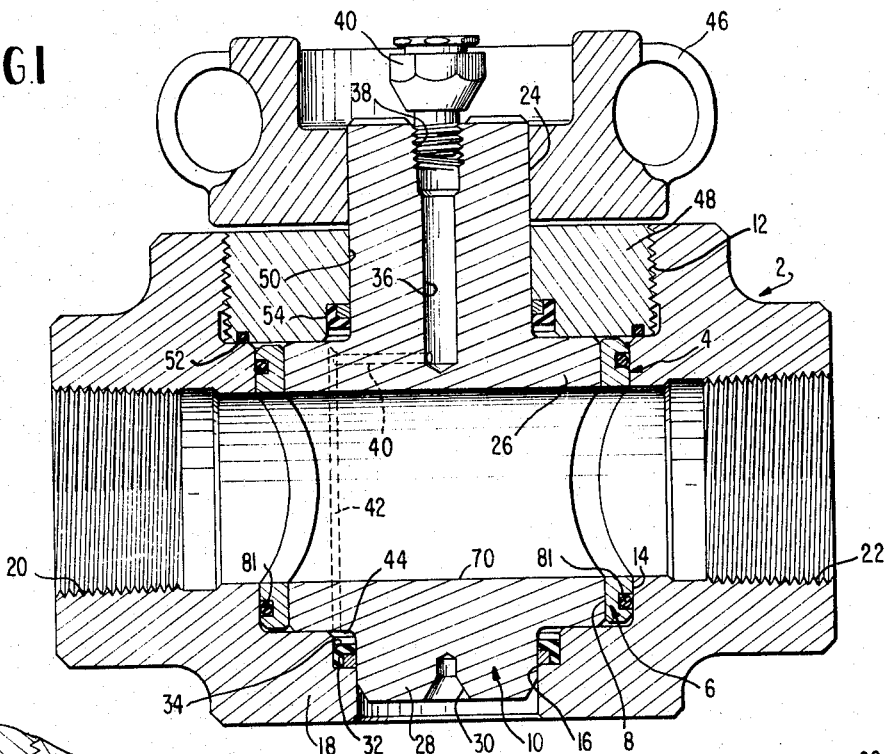
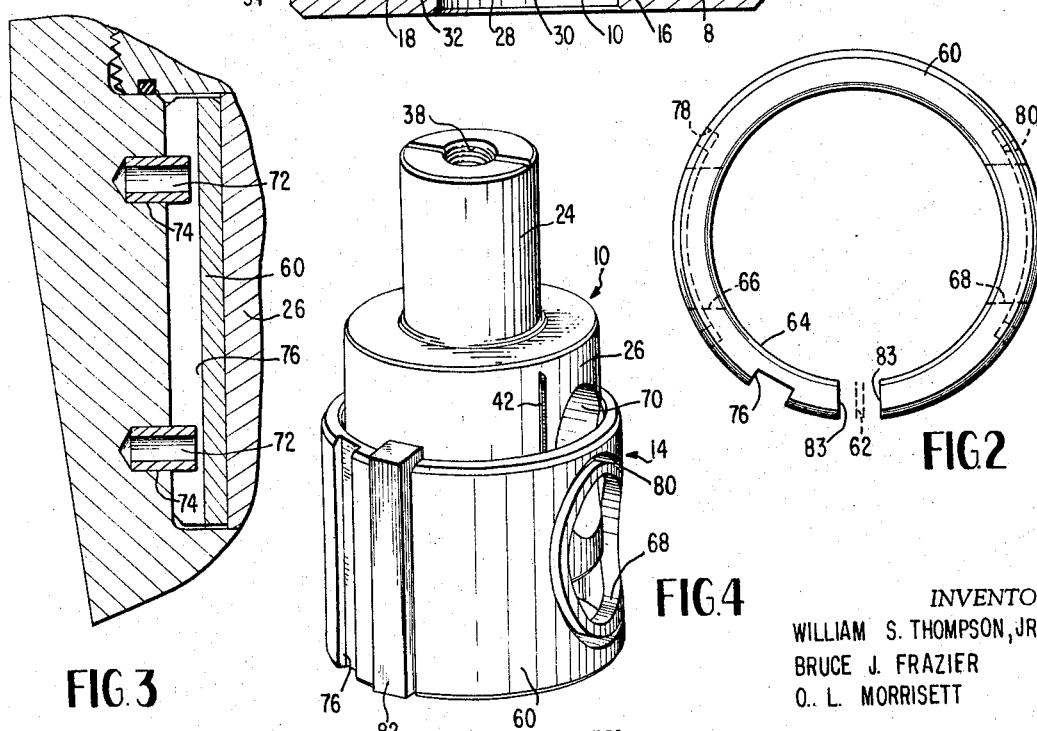
INVENTORS
WILLIAM S. THOMPSON, JR.
BRUCE J. FRAZIER
O. L. MORRISETT
BY *Burns, Doane, Benedict, Swecker & Mathis*
ATTORNEYS

United States Patent Office 3,346,002
Patented Oct. 10, 1967

3,346,002
ROTARY VALVE WITH EXPANDABLE LINER
William S. Thompson, Jr., Bruce J. Frazier, and O. L. Morrisett, Duncan, Okla., assignors to Halliburton Company, Duncan, Okla., a corporation of Delaware
Filed Feb. 12, 1965, Ser. No. 432,189
8 Claims. (Cl. 137—246.22)

ABSTRACT OF THE DISCLOSURE

A rotary valve assembly including a replaceable, radially expandable valve liner, the liner being fixed to the valve housing and rotatably receiving a valve. The valve and liner are dimensioned such that the liner is held in an elastically deformed condition by the valve and a forcefull gripping action is maintained therebetween whereby an upstream seal is effected.

---

This invention relates to valves and, more particularly, to rotary valves having replaceable valve body liners.

Heretofore high pressure rotary valves, such as plug valves, have been available wherein a fixed valve body bore liner is interposed between a rotary valve plug and a valve body. Such liners are considered advantageous because they provide a replaceable bearing surface for the valve plug and protect the valve body against wear or erosion. Although such valves are sometimes adequate for low fluid pressure environments, certain operational problems may be encountered in a high pressure environment. This is because fluid under high pressure, acting against the valve plug in a closed position, frequently leaks by the upstream port seal, and only a "downstream seal" of the plug against the liner is effected. Such downstream seals are sometimes disadvantageous because they permit the influx and sediment of foreign matter in the valve body bore and also because they induce greater deformation or swell of the valve body when acted upon by high fluid pressure.

To circumvent this problem and achieve an "upstream seal," certain of the prior devices have been designed to induce a forceful intimate sealing contact between a rotary valve plug and a fixed valve body liner. To achieve this intimate contact various methods have been employed. Certain of the prior valves have been provided with a tapered liner which is forcefully wedged between the valve body having a tapered bore and the valve plug rotatably mounted therein. Other such valves have included an elastomer or springs between the liner and the body to urge the liner into a forceful intimate sealing contact with the plug. However, such valves, although satisfactory in some respects and in some environments, are not always desirable because they are expensive to fabricate, require greater operating torque, and do not always provide a lasting upstream seal. This latter problem exists because the seal between the liner and the plug depends upon the size and shape of the valve body. When fluid under high pressure is directed through the open valve or leaks by the upstream port thereof when the valve is in the closed position, the ambient pressure tends to distort or swell the valve body thereby altering the force generating an intimate sealing contact between the liner and the plug in accordance with the change of shape of the valve body.

In recognition of the need for an improved rotary valve of the type heretofore described, it is an object of the present invention to provide such rotary valves which substantially obviate or minimize problems such as heretofore noted.

It is a particular object of this invention to provide a rotary valve wherein a forceful intimate sealing contact is maintained between a fixed valve body liner and a rotary valve plug.

Another object of this invention is to provide a rotary valve wherein an efficient and lasting upstream seal is achieved and distortion of the valve body is minimized.

It is a further object of this invention to provide a rotary valve wherein the valve body liner is self-energizing in its maintenance of a forceful intimate sealing contact with the valve plug, this contact being independent of the size or shape of the valve body.

Still another object of this invention is to provide a rotary valve wherein fluid leakage is reduced while affording a lower valve operating torque.

A further object of this invention is to provide a rotary valve having a replaceable liner fixedly interposed between the valve body and valve plug which is of a compact design and minimizes fabrication expense.

It is still another object of this invetnion to provide a method of assembly of a rotary valve offering reduced assembly and fabrication expense.

In achieving these and other objects as will become apparent hereinafter, the present invention provides a method of assembly and a rotary valve resulting therefrom, the valve comprising a valve body having inlet and outlet passageways and a bore transversely disposed with respect to the passageways. An elastically deformable liner is fixedly positioned in the bore of the valve body, the liner having inlet and outlet passageways aligned with the valve body passageways, and a bore transversely disposed with respect to the passageways. A valve plug is rotatably positioned within the bore of the liner, the corresponding dimensions of the valve plug and the bore of the liner being such that the liner is elastically deformed by the valve plug and a forceful gripping action is maintained therebetween.

In assembling the valve according to the present invention, the liner is elastically deformed so as to conform to the dimensions of the corresponding portions of the valve body and the valve plug, the valve plug is inserted in the bore of the further deformed liner, and only partial reduction of the deformation of the liner is permitted after which the liner is fixed against rotation within the valve body.

In describing the invention, reference will be made to a preferred embodiment illustrated by way of example in the accompanying drawings in which:

FIGURE 1 is a vertical, cross-sectional view of a rotary valve embodying the present invention;

FIGURE 2 is a top view of the removable valve body liner of the rotary valve shown in FIGURE 1;

FIGURE 3 is a fragmented view of pins provided in the valve body for rotatably fixing the liner shown in FIGURE 2 within the rotary valve shown in FIGURE 1; and FIGURE 4 is a perspective view representing an intermediate step in assembling the rotary valve shown in FIGURE 1 according to the present invention.

Referring in more detail to FIGURE 1 of the drawings, a rotary plug valve according to the present invention includes a valve body 2 having a cylindrical valve body bore 4 in which a removable, split-sleeve, cylindrical valve body liner 6 is positioned and fixed against rotation. Rotatably mounted within a bore 8 of the split-sleeve liner 6 is a cylindrical valve plug 10.

The valve body bore 4 includes a cylindrical, threaded, enlarged upper portion 12, a cylindrical intermediate portion 14, and a relatively reduced diameter cylindrical lower portion 16 defined by annular, radially inwardly extending shoulders 18 of the valve body 2. Opposed threaded cylindrical inlet and outlet passages, 20 and 22 respectively, are provided in the valve body 2 in fluid communication with the intermediate portion 14 of the bore 4, the central longitudinal axes of the passages 20 and 22 being aligned and perpendicularly oriented relative to the vertical central axis of the bore 4.

The valve plug 10 which is rotatably positioned within the valve body bore 4, comprises a shaft-like, cylindrical upper portion 24 integral with a cylindrical intermediate portion 26 of a relatively increased diameter and a shaft-like cylindrical lower portion 28 having a tool-receiving recession 30 in the lower end thereof. Suitable resilient seal rings 32 are provided in recesses 34 in the upper face of the annular shoulders 18 of the valve body 2 to provide a fluid seal between the shoulders and the lower portion 28 of the valve plug 10.

The upper portion 24 of the valve plug 10 includes a centrally disposed, longitudinally extending bore 36, an enlarged upper end 38 of which is threaded to receive a threaded plug 40 or the like. The lower end of the longitudinally extending bore 36 is in fluid communication with and perpendicular to, two radially extending, horizontally disposed passages 40 in the intermediate portion 26, one of which is shown in phantom lines in FIGURE 1 and the other of which is disposed in the same plane at 180° thereto. The horizontally extending passages 40 are in fluid communication with a pair of longitudinally extending grooves 42 provided at 180° to each other, on the external periphery of the intermediate portion 26 of the valve plug 10. The lower ends of the grooves 42 extend through the intermediate portion 26 of the plug 10 and are in fluid communication with an annular space 44 defined by the upper extent of the lower shaft-like portion 28, and the abutment of a lower face of the intermediate portion 26 with the shoulders 18. By removal of the plug 40 suitable lubricant may be forced into the passages 36, 40, the grooves 42 and into the annular space 44.

Rotatably fixed but axially slidably removable from the upper portion 24 of the valve plug 10 is a valve plug operating handle 46. Removal of the handle 46 permits convenient rotation of a cylindrical plug 48 the outer periphery of which is in threaded engagement of the threaded upper portion 12 of the bore 4 and a lower face of which abuts the valve body 2 at the lower extent of the upper portion 12 of the bore and the upper face of the intermediate portion 26 of the plug 10. Centrally disposed in the cover 48 is a cylindrical bore 50 rotatably receiving the upper portion 24 of the plug 10 which projects therethrough. Suitable resilient sealing rings 52 and 54 are received in annular grooves on the lower face of the cover 48 near the inner and outer periphery, respectively, to provide a fluid seal against the upper portion 24 of the plug and the valve body 2 at the lower extent of the upper portion 12 of the bore 4.

The split-sleeve valve body liner 14 which is snugly but removably interposed between the intermediate portion 26 of the valve plug 10 and the valve body 2 at the intermediate portion 14 of the bore 4, comprises a tubular, metallic sleeve 60. The sleeve 60, although preferably being constructed of a metallic material, may be of any suitable wear-resistant elastically deformable material. The circumference of the sleeve is split along a longitudinal face so as to form a space 62 as shown in phantom lines in FIGURE 2. In this condition the inner diameter of the bore 64 in the sleeve 60 and the outer diameter of the sleeve 60 is less than the outer diameter of the intermediate portion 26 of the valve 10 and the inner diameter of the intermediate portion 14 of the bore 4 in the valve body 2. However, as will be discussed hereinafter, the sleeve 60, being elastically deformable, may be conveniently radially outwardly deformed and positioned snugly about the intermediate portion 26 of the valve plug 10. In this condition, the sleeve 60 is snugly received within the intermediate portion 14 of the bore 4.

The sleeve 60 is provided with inlet and outlet ports 66 and 68 which are coextensive and in alignment with inlet and outlet passageways 20, 22 in the valve body. Upon rotation of the plug valve 10 to the position shown in FIGURE 1, the inlet and outlet ports are aligned with a coextensive, cylindrical passageway 70 in the intermediate portion 26 in the valve plug 10.

Referring to FIGURE 3, vertically spaced tubular pins 72 are fixedly positioned in generally cylindrical recesses 74 in the valve body 2 so as to radially, inwardly project into intermediate portion 14 of the valve body bore 4. The inner ends of the pins 72 are slidably received in a longitudinally extending groove 76 in the external periphery of the sleeve 60. In this manner, the sleeve 60 is fixed within the bore 4 against rotation relative to the valve body 2 but is axially slidable along the longitudinal axis of the valve body bore 4 to facilitate removal through the upper portion 12 of the bore.

Vertically disposed annular grooves 78 and 80 are provided in the external periphery of the sleeve 60 about the inlet and outlet ports 66 and 68 respectively. Suitable resilient O-ring seals 81 are positioned within the grooves 78 and 80 and function to provide an additional fluid seal by abutment against the walls of the valve body 2 defining the intermediate portion 14 about the inlet and outlet passageway therein.

In fabricating and assembling a valve according to the present invention, a tubular section of metallic or other suitable sleeve material is cut to an appropriate length. A mill cut is made through the wall of the sleeve from one end to the other, so as to form a split sleeve the circumference of which is interrupted at one point as at 62 shown in phantom lines in FIGURE 2. The tubular material is radially outwardly deformed as shown in solid lines in FIGURE 2 and a spreader, such as the key 82 as shown in FIGURE 3 is positioned between the split ends 83 of the outward spread tubular material. The tendency of the tubular material to contract holds the key 82 as positioned.

While the sleeve is spread, the bore 64 and the external periphery of the sleeve material are machined to the exact dimensions of the external diameter of the intermediate portion 26 of the plug 10 and the internal diameter of the intermediate portion 14 of the bore 4 in the valve body 2, respectively. The circular ports 66 and 68, as well as the annular grooves 78 and 80 are machined in the sleeve 60 at this point so as to be concentric with the passage 70 in the valve plug 10 and the inlet and outlet passages 20 and 22 respectively of the valve body 2.

The sleeve 60 is then further radially expanded from the position shown in FIGURE 3 to allow removal of the key 82 and insertion of the intermediate portion 26 of the valve plug 10 within the sleeve. The sleeve is then permitted to contract in spring-like fashion upon the valve plug 10, to the size shown in FIGURES 2 and 3, thereby achieving a forceful gripping and an intimate sealing contact between the abutting surfaces thereof. Because the outside diameter of the sleeve 60 is machined to accurately conform to the inside diameter of the intermediate portion 14 of the bore 4 of the body 2 while in the position shown in FIGURES 2 and 3, an intimate contact is also maintained by the external periphery of the expanded sleeve 60 and the bore walls of the valve body upon insertion therein. The resilient O-ring seals 81 in the external periphery of the sleeve 60 about inlet and outlet passages 20 and 22 respectively further enhance a fluid seal between these elements. Accurate vertically positioning of the valve plug and sleeve is achieved through vertical adjustment of the threaded cover 48 in the valve body bore.

It will be appreciated that the intimate sealing contact of the sleeve 60 and the valve plug 10 is of a self-energizing character. The force urging the radial contraction of the sleeve 60 and its contact with the plug is independent of the dimensions or shape of the valve body 2. For this reason, should any deformation or swelling of the valve body occur, which is not likely because the body is insulated from ambient fluid pressure, forceful contact between the inner periphery of the sleeve 60 and the external periphery of the plug is not adversely affected and an upstream seal is maintained. Still further, because the force urging contact between the fixed sleeve and the plug may be accurately established, required operating torque may, in practice, be reduced without inducing fluid leakage.

Finally, it will be seen that an effective seal may be achieved without the fabrication expense of providing tapered bores or liners and without resorting to less compact and more complicated or short-lived elastomers or springs to urge forceful contact of the liner and the plug.

While the invention has been described with reference to a preferred embodiment, it will be apparent to those skilled in the art that additions, deletions, modifications, substitutions and other changes in the specifically described and illustrated embodiment may be made which fall under the purview of the appended claims.

We claim:

1. A rotary valve comprising a valve body having inlet and outlet passages and a bore transversely disposed with respect to said passages, an elastically deformable, split, radially expandable liner fixedly positioned in said bore, said liner having inlet and outlet passageways in fluid communication with said inlet and outlet passageways in said valve body, and a bore transversely disposed with respect to said passageways, a valve rotatably positioned within said bore of said liner, the corresponding dimensions of said valve and said bore in said liner being such that said liner is held in an elastically deformed condition by said valve and a forceful gripping action is maintained therebetween independent of any constraining action of said valve body.

2. A rotary valve according to claim 1 wherein resilient seal means are interposed between said liner and said valve body about the periphery of at least one pair of said inlet and outlet passageways.

3. A rotary plug valve comprising a valve body having inlet and outlet passageways and a cylindrical bore transversely disposed with respect to said passageways, a cylindrical elastically deformable, split, radially expandable liner fixedly positioned within said bore, means fixedly positioning said liner against rotation relative to said valve body, said liner having inlet and outlet passageways in fluid communication with said inlet and outlet passageways in said valve body and a cylindrical bore transversely disposed with respect to said passageways, a cylindrical valve rotatably positioned within said bore of said liner, said valve having a bore adapted to be aligned with said passageways, the corresponding dimensions of said cylindrical valve and said cylindrical bore in said cylindrical liner being such that said liner is held in a radially outwardly, elastically deformed condition by said valve independent of any constraining action of said valve body.

4. A rotary plug valve according to claim 3 wherein resilient seal means are interposed between said liner and said valve body about the periphery of at least one pair of said inlet and outlet passageways.

5. A rotary plug valve according to claim 3 wherein said valve includes passageways for applying lubricant between said valve and said liner and between said valve and said valve body.

6. A rotary plug valve comprising a valve body having inlet and outlet passageways and a cylindrical bore transversely disposed with respect to said passageways, removable cover means closing one end of said bore, a cylindrical metallic elastically deformable replaceable liner fixedly positioned within said bore, said liner comprising a longitudinally split, radially expandable, cylindrical sleeve having inlet and outlet passageways aligned with said passageways in said valve body and a cylindrical bore the longitudinal axis of which is transversely disposed relative to the axis of said passageway, the split of said sleeve defining a longitudinally extending slot communicating with said bore therein, said slot defined by circumferentially spaced, longitudinally extending, opposite ends of said sleeve, said sleeve including a longitudinally extending groove on the outer periphery thereof, pin means fixed to said valve body and projecting into said valve body bore, the radially inward end of said pin means slidably received in said groove to thereby fix said sleeve against rotation relative to said valve body but to permit movement therebetween along the longitudinal axis of said sleeve, a cylindrical valve rotatably positioned within said bore of said sleeve, said valve having a bore adapted to be aligned with said passageways, the corresponding dimensions of said cylindrical valve and said cylindrical sleeve being such that said sleeve is held in a radially outwardly spread elastically deformed condition by said valve wherein said longitudinally extending, opposite ends of said sleeve are held in a circumferentially spaced relation.

7. A rotary plug valve comprising a valve body having opposed inlet and outlet passageways and a cylindrical bore transversely disposed with respect to said passageways, one end of said bore having threads provided therein, removable cover means adjustably threadedly positioned within said one end of said bore, said cover means having a centrally disposed bore, a cylindrical metallic, elastically deformed, replaceable liner fixed within said bore of said body, said liner comprising a longitudinally split, radially expandable, sleeve having opposed inlet and outlet passageways aligned with said passageways in said valve body and a cylindrical bore the longitudinal axis of which is transversely disposed relative to the axes of said passageways, the split of said sleeve defining annular grooves on the outer periphery thereof concentric with said passageways, resilient seal rings projecting from said annular grooves, and abutting said valve body, the split of said sleeve defining a longitudinally extending slot communicating with said bore therein, said slot being remote from said passageways and defined by opposed, circumferentially spaced, longitudinally extending ends of said sleeve, said sleeve including a longitudinally extending groove on the outer periphery thereof, vertically spaced pin means fixed to said valve body and slidably projecting into said grooves to fix said sleeve against rotation relative to said body but to permit removal of said liner through said one end of said bore in said valve body, a cylindrical valve plug rotatably positioned within said bore of said sleeve, said plug including an upper shaft-like portion projecting through said centrally disposed bore in said cover means, operating means fixed to said upper end of said plug, said plug having an enlarged cylindrical intermediate portion snugly but rotatably received within said bore of said sleeve, said intermediate portion including a passageway aligned with said passageways in said sleeve, the outside diameter of said intermediate portion and the diameter of said bore being substantially equal, wherein said longitudinally extending ends of said sleeve are held in a circumferentially spaced position against the tendency of said sleeve to radially contract, said intermediate portion of said plug having an upper face contacting a lower face of said cover means, and said cover means including resilient seal means contacting said plug and said valve body to seal thereagainst.

8. A rotary plug valve comprising a valve body having inlet and outlet passageways and a cylindrical bore transversely disposed with respect to said passageways, a cylindrical elastically deformable liner fixedly positioned within said bore, means fixedly positioning said liner against rotation relative to said valve body, said liner having inlet and outlet passageways in fluid communication with said inlet and outlet passageways in said valve body and a cylindrical bore transversely disposed with respect to said passageways, a cylindrical valve rotatably positioned within said bore of said liner, said valve having a bore adapted to be aligned with said passageways, the corresponding dimensions of said cylindrical valve and said cylindrical bore in said cylindrical liner being such that said liner is held in a radially outwardly, elastically deformed condition by said valve, said liner comprising a longitudinally split, radially expandable cylindrical sleeve.

References Cited

UNITED STATES PATENTS

| | | | |
|---|---|---|---|
| 2,346,052 | 4/1944 | Seamark | 251—163 |
| 2,414,966 | 1/1947 | Melichar | 251—160 X |
| 2,744,720 | 5/1956 | Wilms | 251—163 X |
| 2,954,961 | 10/1960 | Stogner | 251—316 X |
| 3,072,379 | 1/1963 | Hamer | 251—317 X |

CLARENCE R. GORDON, *Primary Examiner.*